W. B. WESTCOTT, JR 2,868,482

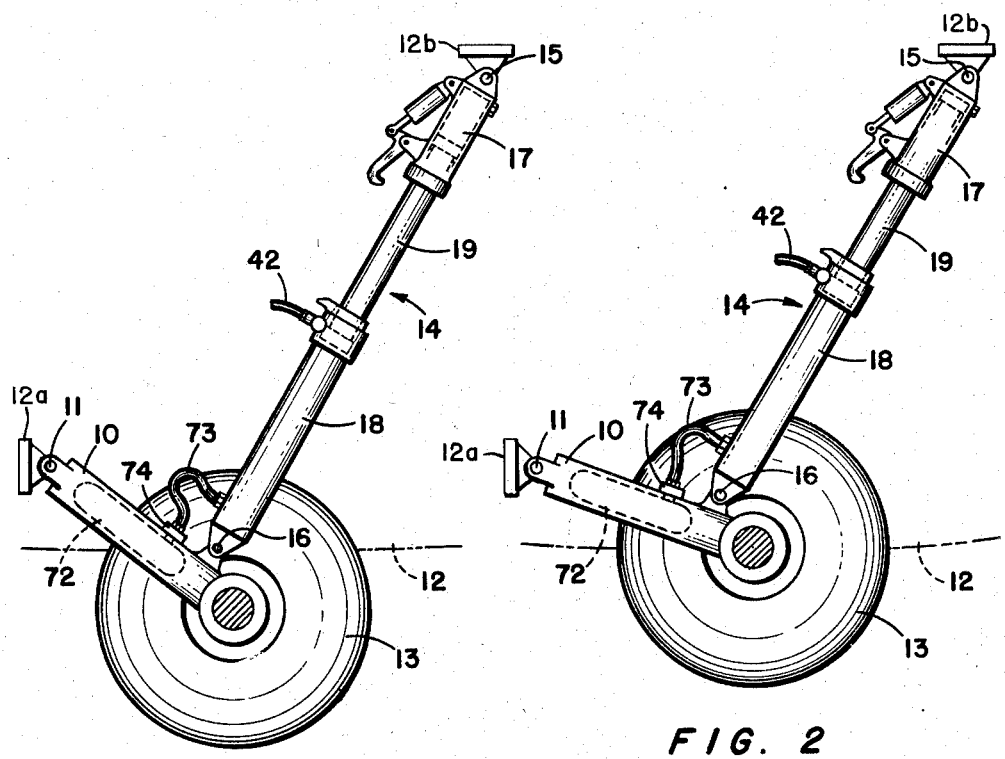
FIG. 1
FIG. 2
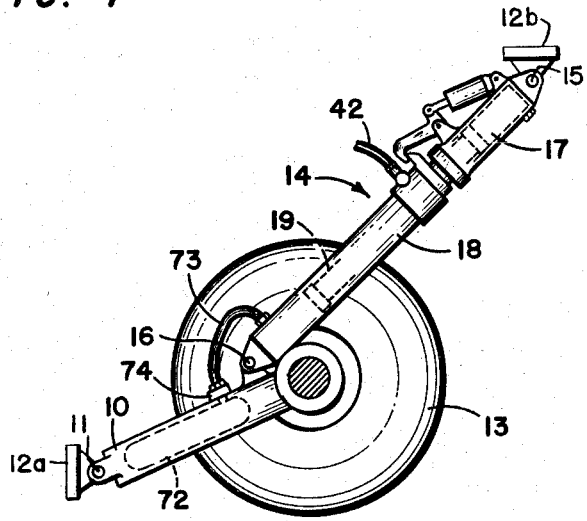
FIG. 3
INVENTOR.
WILLIAM B. WESTCOTT, Jr.
BY
ATTORNEY Jan. 13, 1959

RETRACTABLE LANDING GEAR

Filed Oct. 18, 1955

INVENTOR.
WILLIAM B. WESTCOTT, Jr.
BY
ATTORNEY

United States Patent Office 2,868,482
Patented Jan. 13, 1959

2,868,482

RETRACTABLE LANDING GEAR

William B. Westcott, Jr., Cleveland Heights, Ohio, assignor to Cleveland Pneumatic Industries, Inc., Cleveland, Ohio, a corporation of Ohio Application October 18, 1955, Serial No. 541,249

1 Claim. (Cl. 244—102)

This invention relates to landing gears in general and more particularly to a simplified retractable landing gear structure.

It is an important object of this invention to provide a new and improved load strut which combines the elements of the fluid spring with the elements of the retraction actuator, thereby simplifying the overall landing gear structure.

It is still another object of this invention to provide a new and improved lever suspension type landing gear which necessitates the use of only two mounting points on the frame of the aircraft.

It is still another object of this invention to provide a new and improved retractable landing gear wherein the retraction actuator is integrally formed in the load strut.

It is another important object of this invention to provide a retractable landing gear of the lever suspension type wherein the landing gear includes a wheel journaled on a horizontally extending lever which is pivoted on the frame of the aircraft in combination with a load strut which controls the rotation of the lever around the pivot of the lever on the aircraft frame.

Further objects and advantages will appear from the following description and drawings, wherein:

Figure 1 is a side elevation of a landing gear incorporating this invention showing the relative position of the elements when the landing gear is fully extended;

Figure 2 is a view similar to Figure 1 showing the relative position of the elements when the fluid spring of the landing gear is fully compressed;

Figure 3 is a view similar to Figure 1 showing the relative position of the elements when the landing gear is retracted;

Figure 4:
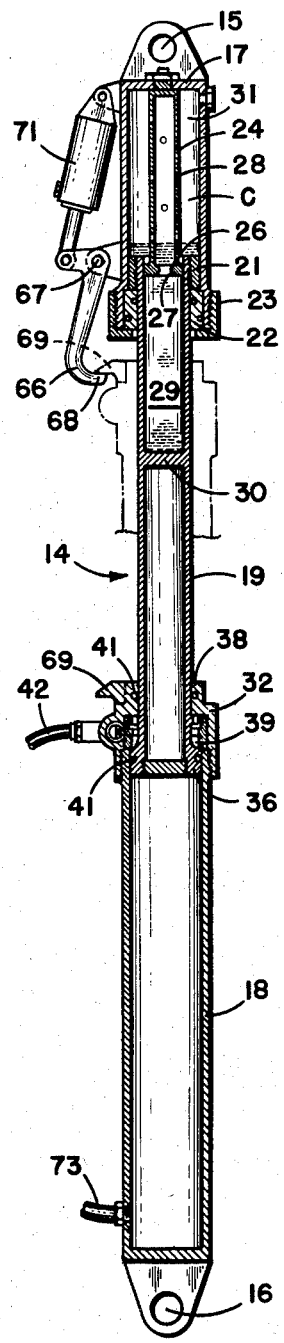
Figure 4 is an enlarged longitudinal section of the load strut.

A lever suspension type landing gear includes a landing wheel which is journaled on a horizontally extending lever that is in turn pivoted to the frame of an aircraft and cooperates with a load strut assembly which controls the rotation of the lever around its pivot on the aircraft frame. The load strut according to this invention resists rotational movement of the lever around the lever pivot on the aircraft frame during normal landing operations, and also provides an actuator to retract the landing gear into the fuselage after the aircraft is air-borne. This type of landing gear is particularly suited for high wing cargo aircraft wherein the landing gear must be retracted into the fuselage proper.

Reference should now be made to the drawings for a clear understanding of a preferred landing gear according to this invention. A lever 10 is adapted to be pivotally attached to the fuselage frame of an aircraft shown schematically at the mounting pad 12a for rotational motion around the axis of a pivot 11. The aircraft is not shown since the particular structure is not critical to this invention; however the lower portion of the fuselage frame would normally be at a position shown schematically at 12 in Figures 1 through 3. A landing wheel 13 is journaled on the end of lever 10 opposite from the pivot 11 and a load strut 14 is pivotally connected as at 16 at its lower end to the lever 10 at a point spaced from the pivot 11 and is adapted to be connected to the fuselage frame of the aircraft again shown schematically at the mounting pad 12b by a pivotal connection 15 at its upper end. When the aircraft lands a vertical force is transmitted through the wheel 13 which produces a torque that rotates the lever 10 in a counter clockwise direction around the pivot 11. This torque is resisted by the load strut in a manner which will be described in detail later. Figure 2 discloses the extreme position to which the wheel 13 can move to during a landing, however it should be understood that normally the wheel will assume a static position relative to the bottom of the fuselage 12 which is between the position shown in Figure 1 and the position shown in Figure 2 when the aircraft is on the ground.

When it is desired to retract the landing gear so that the wheel 13 will be completely within the fuselage of the aircraft, the load strut 14 is shortened causing the lever 10 to rotate around the pivot 11 to the position shown in Figure 3 at which time the wheel 13 is above the bottom of the fuselage 12 and in its fully retracted position.

Reference should now be made to Figure 4 wherein the structure of the load strut 14 is shown. The load strut is made up of three basic components, a fluid spring cylinder 17, an actuator cylinder 18 and a piston member 19. The upper end of the piston 19 projects into the fluid spring cylinder 17 and the lower end projects into the actuator cylinder 18. Therefore three basic members serve to provide the piston and cylinder of both a fluid spring and a fluid actuator.

An upper bearing 21 is threadedly connected to the upper end of the piston member 19 and a cooperating lower bearing 22 is mounted on the fluid spring cylinder 17 by a flange nut 23. These bearings provide a connection between the piston 19 and the fluid spring cylinder 17 which permit relative axial motion therebetween while preventing relative lateral motion. The two bearings 21 and 22 are adapted to engage as shown in Figure 4 to limit the downward movement of the piston 19.

Mounted on the fluid spring cylinder 17 is a plunger tube 24 which extends to the upper end of the piston 19. The lower end of the plunger tube 24 is provided with a flanged portion 26 which engages the inner wall of the piston 19 and defines a central orifice 27. The plunger tube 24 is formed with a plurality of radial openings 28 so that the zone within the plunger tube is in communication with the zone around it. The piston 19 is provided with a bulkhead 30 which in cooperation with the fluid spring cylinder 17 and piston 19 defines a cavity "C" filled with pressure fluid. The flanged portion 26 divides the cavity "C" into a lower chamber 29 below the flanged portion and an upper chamber 31 including both the zone within the plunger tube and the zone around it.

The lower chamber 29 is filled with liquid as is the lower portion of the upper chamber 31, the remaining portions of the upper chamber 31 being charged with gas under pressure. Because the two chambers 29 and 31 are connected through the orifice 27 the liquid within the chamber 29 is normally at the same pressure as the gas within the chamber 31. Therefore a reaction force is developed on the piston 19 which urges it axially downward relative to the fluid spring cylinder 17. The force of course is proportional to the pressure of the fluid within the spring which is in turn determined by the relative axial position of the piston 19 and the fluid spring cylinder 17. During the landing impact of the aircraft the piston 19 moves rapidly upwardly relative to the fluid spring cylinder 17 and causes a large increase in the pressure of the liquid within the lower chamber 29 which causes the liquid to flow through the orifice 27 into the upper chamber 31. During this flow the impact energy is absorbed by the restricted flow of liquid through the orifice 27. After the impact is absorbed the static weight of the aircraft is resiliently supported by the pressure of the fluid within both chambers 29 and 31.

To provide for the retraction of the landing gear, an enlarged piston head 36 is formed on the lower end of the piston 19 which engages the inner surface of the actuator cylinder 18. An end member 32 is threaded onto the upper end of the actuator cylinder 18 and is provided with a radial bearing portion 38 which engages the outer surface of the piston 19 and in cooperation with the piston head 36 defines an actuator chamber 39 around the piston 19. Suitable seals 41 on the piston head 36 and the bearing portion 38 prevent fluid leakage out of the actuator chamber 39.

When fluid under pressure is introduced into the actuating chamber 39, a reaction force is developed urging the actuating cylinder 18 upwardly relative to the piston 19. This of course shortens the load strut moving the pivot 16 toward the pivot 15 and accomplishes the retraction of the landing gear to the position shown in Figure 3. A pressure line 42 provides the connection from the retraction pressure system of the aircraft to the actuator chamber 39 through a suitable control valve (not shown) which is operated by the pilot of the aircraft when he wishes to retract the landing gear.

Figure 5:
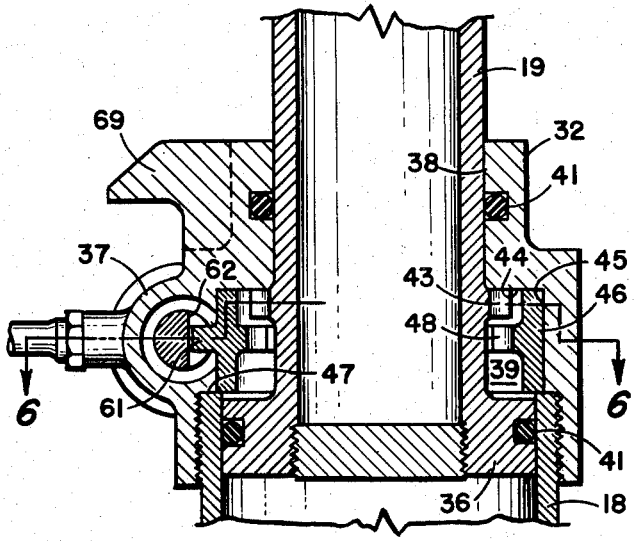
Figure 5 is an enlarged fragmentary longitudinal section of the actuator lock mechanism; and, Figure 6 is a cross section taken along 6—6 of Figure 5.
Figure 6:
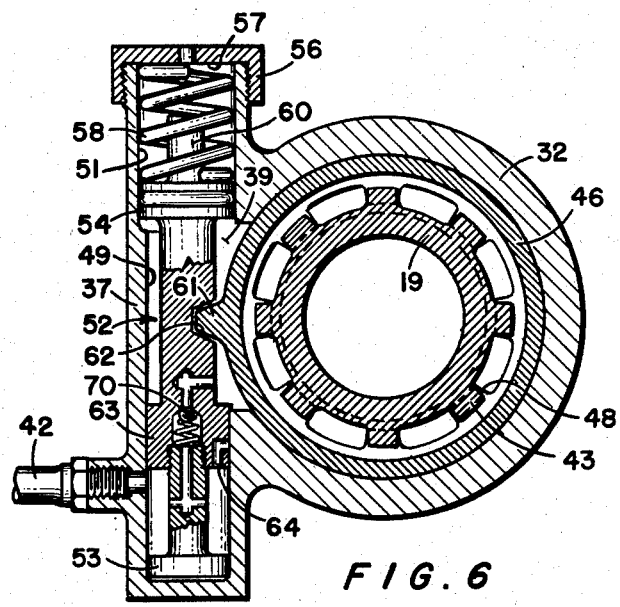

A down lock mechanism, best shown in Figures 5 and 6, is utilized to prevent the actuator cylinder 18 from moving upwardly relative to the piston 19 during the landing of the aircraft and while it is on the ground. The piston 19 is provided with a male spline 43 which engages a radial wall 44 formed on the end member 32 when the actuator cylinder 18 is in the fully extended position shown in Figure 4. A lock ring 46 is radially positioned in an axial bore 45 in the end member 32 and axially positioned between the radial wall 44 and the upper end 47 of the actuator cylinder 18 so that it is axially fixed and rotatable relative to the actuator cylinder. The lock ring 46 is formed with a female spline 48 which is adapted to cooperate with the male spline 43 and prevent movement of the actuator cylinder 18 upwardly relative to the piston 19 when the teeth of the two splines are aligned. However if the lock ring 46 is rotated so that the teeth on the female spline 48 are aligned with the spaces between the teeth on the male spline 43, the two splines can pass each other and thereby permit axial motion of the actuator cylinder 18 upwardly along the piston 19. When the actuator cylinder 18 is in the fully extended position and transmitting a tension load the two splines 43 and 48 are slightly spaced so that there will be no friction resisting the rotation of the lock ring 46.

It is necessary when it is desired to retract the landing gear to insure that the lock ring rotates to the unlocked position wherein the teeth on the female spline are aligned with the spaces on the male spline before the pressure within the actuating chamber 39 moves the actuator cylinder 18 upwardly relative to the piston 19. I therefore provide a lock operator in the fluid circuit between the pressure line 42 and the actuator chamber 39. Reference should be made to Figure 6 for this structure. The end member 32 is provided with a first cross bore 49 and a second larger co-axial cross bore 51 within a boss 37. A plunger assembly 52 is positioned within the two cross bores 49 and 51 and is provided with a guide 53 in the first cross bore 49 and a guide 54 in the second cross bore 51. These guides support the plunger assembly 52 against lateral motion while permitting axial motion thereof. A cap member 56 is threaded onto the end of the boss 37 over the second cross bore 51 and provides a radial surface 57 against which one end of a coil spring 58 is seated. The other end of the spring 58 engages the outer end of the guide 54 and resiliently urges the plunger 52 axially inward until the guide 53 seats at the bottom of the first cross bore 49.

The lock ring 46 is formed with a radial arm 61 which projects into a recess 62 in the plunger assembly 52 and the various elements are proportioned so that the teeth on the two splines 43 and 48 are aligned when the guide 53 is seated against the end of the first cross bore 49. However when the plunger 52 moves against the force of the spring 58 until a stop 60 formed on the plunger 52 engages the radial surface 57, the lock ring 46 is rotated by the arm 61 until the teeth on the female spline 48 are aligned with the spaces between the teeth of the male spline 43.

The plunger assembly is provided with a piston head portion 63 intermediate the two guides 53 and 54 which provides a close fit with the first cross bore 49. Therefore when fluid under pressure is supplied to the outer side of the piston portion 63 through the pressure line 42, a force is developed on the plunger assembly 52 which moves it axially against the force of the spring 58 until the stop 60 seats against the radial surface 57. This movement of course rotates the lock ring 46 to the unlocked position wherein the actuator cylinder 18 can move axially up along the piston 19. The axial movement of the piston portion 63 causes a displacement which reduces the volume within the actuating chamber 39. However since the guide 54 has a larger diameter than the piston portion 63 and since it moves axially the same distance there will be a total increase of the volume within the actuator chamber 39 caused by the movement of the plunger 52 so the movement of the plunger 52 cannot build up the pressure within the actuator chamber 39. Therefore this movement cannot create a pressure within the actuator chamber 39 which could cause movement of the actuator cylinder before the lock ring has rotated to the unlocked position.

The piston portion 63 is provided with a fluid passage 64, one end of which is isolated from the actuator chamber when the plunger assembly 52 is in the position shown in Figure 6, and which is in communication with the actuator chamber 39 when the plunger 52 moves the lock ring 46 to the unlocked position. Since the other end of the passage 64 is always in fluid communication with the pressure line 42 fluid under pressure can flow into the actuator chamber 39 only after the lock ring 46 is rotated to the unlocked position. The flow of pressure fluid into the actuator chamber 39 causes the actuator cylinder 18 to move axially up along the piston 19, thus retracting the landing gear. For a more detailed description of this lock mechanism, reference should be made to the copending application Serial Number 543,141 filed October 27, 1955, now U. S. Patent 2,811,136, issued October 29, 1957, wherein the lock mechanism per se is disclosed and claimed.

An up lock 66 is mounted on the fluid spring cylinder 17 by a pivot pin 67 and is provided with a hook portion 68 which cooperates with a latch 69 formed on the end member 37 when the actuator cylinder 18 moves to its upper or retracted position as shown in phantom in Figure 4. A hydraulic cylinder 71 connected between the up lock 66 and the fluid spring cylinder 17 is adapted to release the up lock by rotating it around the pivot pin 67 when it is desired to extend the landing gear.

In operation prior to the landing of the aircraft, the landing gear is in the extended position of Figure 1 wherein the piston 19 is fully extended relative to the fluid spring cylinder 17 and the two bearings 21 and 22 engage to prevent further downward axial motion of the piston 19. Also the actuator cylinder 18 is at its lowermost position relative to the piston 19 and the male spline 43 is in engagement with the radial wall 44. At this time the lock ring 46 is in the locked position and the actuator cylinder 18 cannot move axially relative to the piston 19. When the wheel 13 engages the ground an upward force is transmitted through the actuator cylinder 18 and the lock ring 46 to the piston 19 which causes it to move upwardly relative to the fluid spring cylinder 17. This permits rotation of the lever 10 around the pivot 11 toward the position shown in Figure 2. During this movement the impact of landing is absorbed by the flow of liquid from the lower chamber 29 through the orifice 27 into the upper chamber 31. After the aircraft is on the ground its weight is supported by the reaction force of the pressure fluid in the cavity "C."

When the aircraft is air-borne after take-off the weight of the wheel 13 as well as the pressure within the fluid spring causes the piston 19 to move to the extended position until the two bearings 21 and 22 engage. At this time the weight of the wheel 13 holds the teeth 43 against the wall 44 and axial clearance is provided between the teeth 43 and 48. Fluid under pressure may then be introduced into the chamber 39 through the pressure line 42 to cause retraction of the landing gear. As previously described the fluid under pressure unlocks the down lock and then causes the actuator cylinder 18 to move up along the piston 19 until the latch 69 engages the up lock 66 at which time the landing gear is retracted and the wheel is within the fuselage of the aircraft as shown in Figure 3. When it is desired to extend the landing gear it is merely necessary to release the up lock 66 by supplying fluid to the hydraulic cylinder 71 while the pressure line 42 is connected to the reservoir return. The weight of the wheel 13 will cause the actuator cylinder 18 to move downwardly relative to the piston 19 after the up lock is released until the landing gear is in the fully extended position. The fluid in the actuator chamber 39 can freely flow to the pressure line 42 and the reservoir through a back check valve means 70 formed in the plunger 52 to allow the plunger to be returned to the Figure 6 position by the spring 58. The lower portions of the teeth on the lock ring 46 are formed with cam surfaces which rotate the lock ring and permit the male spline 43 to pass so that the landing gear can move to the fully extended position. This camming structure is described in the copending application cited above.

To provide for an emergency extension of the landing gear in case the up lock jams or any other malfunction prevents the weight of the wheel 13 from extending the landing gear, I prefer to provide a pressure tank 72 within the lever 10 which is connected to the lower end of the actuator cylinder 18 through a flexible hose 73 and an electrically operated valve 74. The pressure tank 72 is charged with gas which can be introduced into the lower end of the actuator cylinder 18 when the valve 73 is opened to cause a downward force on the actuator cylinder 18 relative to the piston 19. Since the effective area of the lower side of the piston head 36 is large, a very large downward force is created as high pressure gas is introduced to the actuator cylinder 18 and this force is sufficient to shear the up lock structure and cause extension of the gear if an emergency arises. Also if the down lock fails to operate sufficient force will be created on the piston head 36 to support the weight of the aircraft during an emergency landing.

The stroke of the retraction actuator must necessarily be longer than the stroke of the fluid spring, however if the various elements are arranged so that the pivot 16 approaches a line between the pivots 11 and 15 when the landing gear is retracted minimum stroke length on the actuator may be used. This is due to the fact that the angular rotation of the lever 10 increases for a given amount of actuator movement as the pivots approach an aligned relationship. Those skilled in the art will recognize that by utilizing the simple structure disclosed, it is possible to provide a load strut 14 which is strong and very light in weight. Also manufacturing costs are reduced since the single outer surface of the piston 19 serves as the bearing and seal surface for both of the cylinders 17 and 18.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

I claim:

In a device of the character described a frame having a lower portion, a lever having two ends with one end pivotally connected to said frame for rotation between an extended position and a retracted position, a ground engaging member journaled on the other end of said lever extending below the lower portion of said frame when said lever is in said extended position and being positioned above the lower portion of said frame when said lever is in said retracted position, a load strut pivotally connected to said lever at a point spaced from the pivot of said lever on said frame and pivotally connected to said frame at a point spaced from both of said first named pivots, said load strut extending substantially perpendicular to said lever when the latter is in said extended position and approaching alignment therewith when said lever is in said retracted position, said load strut including a fluid spring cylinder and a piston co-operating therewith to form a fluid spring and a retraction actuator cylinder co-operating with said piston to form a retraction actuator, the stroke of said fluid spring being sufficiently short so that rotation of said lever from said extended position fully compressing said spring occurs before said ground engaging member moves into said frame and the stroke of said actuator being sufficiently large to move said lever to a retracted position, first lock means connecting between said piston and said retraction actuator cylinder preventing movement therebetween when said lever is in said extended position, and second lock means connected between both of said cylinders preventing movement therebetween when said lever is in said retracted position.

References Cited in the file of this patent

UNITED STATES PATENTS

| | | |
|---|---|---|
| 1,768,696 | Laddon | July 1, 1930 |
| 2,313,242 | Johnson | Mar. 9, 1943 |
| 2,459,982 | Wells | Jan. 25, 1949 |
| 2,563,194 | Shawbrook | Aug. 7, 1951 |
| 2,691,496 | Katzenberger | Oct. 12, 1954 |